US007809666B2

(12) United States Patent
Citeau

(10) Patent No.: US 7,809,666 B2
(45) Date of Patent: Oct. 5, 2010

(54) METHOD AND SYSTEM FOR SEQUENTIAL COMPILATION AND EXECUTION OF RULES

(75) Inventor: Hugues Citeau, Longeville sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 11/635,918

(22) Filed: Dec. 7, 2006

(65) Prior Publication Data

US 2009/0228421 A1   Sep. 10, 2009

(51) Int. Cl.
*G06N 5/02* (2006.01)
(52) U.S. Cl. ............................... 706/47; 706/45; 706/46
(58) Field of Classification Search ............. 706/45–47; 717/101–102, 106–108, 114–118, 136, 137–140, 717/148
See application file for complete search history.

(56) References Cited

U.S. PATENT DOCUMENTS

| | | | | |
|---|---|---|---|---|
| 4,849,905 | A * | 7/1989 | Loeb et al. ..................... | 706/48 |
| 6,078,911 | A * | 6/2000 | Bonissone et al. ............ | 706/52 |
| 6,546,545 | B1 | 4/2003 | Honarvar et al. | |
| 6,609,120 | B1 | 8/2003 | Honarvar et al. | |
| 6,851,108 | B1 * | 2/2005 | Syme et al. ................. | 717/146 |
| 6,895,575 | B2 | 5/2005 | Dharamshi | |
| 7,065,745 | B2 * | 6/2006 | Chan .......................... | 717/117 |
| 7,313,552 | B2 * | 12/2007 | Lorenz et al. ................. | 706/47 |
| 7,428,723 | B2 * | 9/2008 | Greene et al. ............... | 717/103 |
| 2004/0117765 | A1 * | 6/2004 | Chan .......................... | 717/117 |
| 2005/0165707 | A1 * | 7/2005 | Rehberg et al. ............... | 706/47 |

(Continued)

OTHER PUBLICATIONS

Marathe et al. "An Algorithm for Identification of Relations Among Rules", IEEE, 1989, pp. 360-367.*

(Continued)

*Primary Examiner*—Donald Sparks
*Assistant Examiner*—Omar F Fernandez Rivas
(74) *Attorney, Agent, or Firm*—Joseph E. Bracken; Steven M. Greenberg, Esq.; Carey Rodriguez Greenberg & Paul LLP

(57) ABSTRACT

Systems and methods for matching objects against a set of rules are described. The present invention is a novel rule execution algorithm that generally operates with greater efficiency than known algorithms. The algorithm uses a test analyzer to determine the relationships that exist between pairs of tests within a ruleset. Each rule is then translated into loops and tests, and merged into a unified series of loops and tests using the output of the test analyzer. The algorithm then generates pattern matching code corresponding to the unified series of loops and tests for evaluation by a virtual machine, and auxiliary code that provides object manipulations and rule actions at the service of the pattern matching code. In its runtime, the algorithm loads objects into the pattern matching code through an access interface. The pattern matching code is then executed by the virtual machine against the loaded objects.

18 Claims, 7 Drawing Sheets

U.S. PATENT DOCUMENTS

| | | | |
|---|---|---|---|
| 2005/0246301 A1 | 11/2005 | Lin et al. | |
| 2005/0246302 A1* | 11/2005 | Lorenz et al. | 706/47 |
| 2005/0246686 A1 | 11/2005 | Seshadri et al. | |
| 2005/0273772 A1* | 12/2005 | Matsakis et al. | 717/136 |
| 2005/0289527 A1* | 12/2005 | Illowsky et al. | 717/148 |
| 2006/0173994 A1 | 8/2006 | Emeis et al. | |
| 2006/0200494 A1 | 9/2006 | Sparks | |
| 2008/0097748 A1* | 4/2008 | Haley et al. | 704/9 |

OTHER PUBLICATIONS

Charles Forgy, *Rete; A Fast Algorithm for the Many Pattern/Many Object Pattern Match Problem*, Artificial Intelligence 19, 1982 at 17-37.

ILOG; Selections from Online Documentation for ILOG JRules Software, v6.0 and v6.5, 2006 (47 pages).

* cited by examiner

METHOD AND SYSTEM FOR SEQUENTIAL COMPILATION AND EXECUTION OF RULES

FIELD OF THE INVENTION

The present invention relates to algorithms that execute rules. More specifically, this invention relates to systems and methods for matching objects against a set of rules.

BACKGROUND OF THE INVENTION

Datasets are used in a wide variety of practical applications. Object models can be used to describe how datasets are organized. An exemplary object model in the e-business domain would include a group of classes, which may correspond to a group of tables containing data in a database. Each class contains a different set of data pertaining to, for example, customer personal information, invoices, or product inventory. These classes are related by common fields shared by the classes, such as a customer number used in both the customer class and the invoice class, or an item number used in both the invoice class and the product inventory class.

In this example, a customer class would contain fields, corresponding to columns in a table, such as customer name, customer number, address and telephone number. The set of the aforementioned fields and the field types contained within each customer object would define the customer class. The individual objects correspond to rows of data in the table, generally with values for each field associated with the object. For instance, there would be an object for customer Allen, and Allen's personal information would be stored as values corresponding to each of the name, customer number, address, and telephone number fields.

Rules are used to organize objects. Rules act upon tuples, which may comprise an object or a combination of objects. In many practical applications, rules are used to segregate groups of data within datasets for use by the owner of the dataset. For example, a retail business owner may want a set of customers to send marketing materials or to offer sales or promotions. To do so, the retailer would use a ruleset to identify a subset of customers within the entire dataset.

Rules are composed of conditions, which include one or more tests, and one or more actions that are associated with the conditions. If the conditions of the rule are met, then the action is performed.

There are several types of conditions commonly used in rules. These include "simple" conditions, the "exists" condition, the "not" condition, and the "collect" condition. In order to process a given object, a "simple" condition first determines if the object belongs to the desired class, and then determines if the object satisfies the tests within the condition. The "exists" condition and the "not" condition operate upon a set of objects instead of a single object, and determine whether or not the desired object exists or does not exist within the set. The "collect" condition functions by first constructing a set of objects from the dataset that satisfies an inner "simple" condition, and then performs subsequent testing on the assembled set of objects.

Examples of rules include "if the age of a person is not between 0 and 120, return an error" or "if the price value of a shopping cart exceeds $200, reduce the price value by 10%." In the preceding examples, the "if" clause is the condition, which must be met for the action to take place. The condition here is a "simple" condition because it acts upon a single object, rather than a set of objects. Likewise, the "return" and the "reduce" clauses are the actions, which are executed when the conditions are true. Software platforms are currently used to build systems to work with sets of rules. One example of such a software platform is sold by ILOG, Inc. of Mountain View, Calif. under the title JRules.

To work with rules, a software platform generally utilizes a rule language and a rule engine. A rule language is a computer language which allows description of the rules using formal syntax. A rule engine is the software that actually executes the rules in the order determined by a rule execution algorithm.

A rule execution algorithm generally converts the given rules written in the syntax prescribed by the rule language into an internal representation form, reorganizes the rules through analysis and optimization, and then executes them. Two examples of rule execution algorithms are known as the RETE algorithm and the Sequential algorithm.

It is believed that the RETE algorithm was originally described in Charles Forgy, *Rete; A Fast Algorithm for the Many Pattern/Many Object Pattern Match Problem*, Artificial Intelligence 19, 1982 at 17-37. Modifications of the original RETE algorithm are known in the art. The RETE algorithm generally works by first building a rule execution graph from the rules, called the RETE network. In the RETE network, each object is classified through a series of discrimination tests, which organizes the objects based on one or more fields, such as age, and stores the results into a "node," or location in the RETE network. The discrimination tests in the RETE network are inferred from the conditions of the ruleset. The network is arranged such that the application of one rule may cause other rules to become executable, a technique known as "rule chaining." When a rule requires testing against multiple objects, instead of a single object, a join-test is utilized. Join tests are more complex than discrimination tests, but as indicated above are only used when a rule requires testing against multiple objects. When the rule conditions are met, then the corresponding prescribed action or actions are executed.

The RETE algorithm is generally well suited for production rule sets and computation rule sets, because it is stateful and maintains incremental behavior, meaning objects can be added, changed, or removed from the data set while the algorithm is running.

A disadvantage of the RETE algorithm, however, is that it generally does not provide any efficiency advantages when the ruleset consists of simple compliance/validation rules.

Compliance/validation rules simply determine whether or not an object has certain characteristics or properties. Based upon the outcome of the condition, a value is associated with the object. For example, a set of compliance/validation rules for a retailer could say: if the customer has spent a total of $1000 or more, his membership level value is "gold;" if the customer has spent between $500 and $1000, his membership level value is "silver;" and if the customer has spent less than $500, his membership level value is "bronze." In this example, the customer objects may or may not have membership level values stored before the rule is executed. If there are pre-stored values when the rule is executed, then the membership level value is overwritten for each customer object. A compliance/validation rule example for the e-business context is "if the description of an item contains the terms 'sex' or 'gun,' then the item is marked invalid." This rule could be used to screen classified advertisement or online auction listings before accepting the listing, for example. Because compliance/validation rules generally operate upon a single given object, the RETE algorithm does not generally provide increased efficiency.

Another disadvantage of the RETE algorithm is that it lacks scalability, because it can only, in practice, deal with several thousand rules. The RETE algorithm therefore cannot be used at all in some compliance/validation applications, which may involve hundreds of thousands of rules.

Another disadvantage of the RETE algorithm is that it cannot deeply optimize the ruleset because it is required to maintain consistency when objects are added, deleted, or changed. This in turn entails repeated execution of the ruleset when these changes are made, resulting generally in further inefficiency.

A second example of a known rule execution algorithm is a "sequential" algorithm. In the sequential algorithm, generally each of the given rules is converted to an "if-then" function. Each object is then evaluated one by one against every rule. If, for the first rule, the condition is met, then the corresponding actions are executed. Regardless of whether or not the actions for the first rule are executed, the algorithm tests the object against the next rule. The process is repeated for every rule in sequence until all of the rules have been evaluated. The next object is then loaded, and the rules are executed again until every object has been processed. The number of tests performed is therefore the product of the number of rules and the number of objects.

The sequential algorithm generally can handle hundreds of thousands of rules in compliance/validation applications because it does not build a RETE network, instead building loops and tests corresponding to each rule. The sequential algorithm also is generally transparent, meaning it conceals the execution of the algorithm from the user, and in doing so shields the user from the algorithm and engineering complexity. This engineering complexity includes dividing the generated code into segments that comply with the size restrictions of the programming language, which would be difficult if the code was manually drafted. Furthermore, the sequential algorithm can generally be configured for dynamic selection of the rules as active or inactive for each object, resulting in higher accuracy of rule application and therefore, greater efficiency.

The sequential algorithm has several drawbacks. First, the algorithm's runtime can be significantly longer than other rule execution algorithms because every rule is applied to every object unless some dynamic selection is utilized. The sequential algorithm also is generally less efficient than other rule execution algorithms because it must evaluate all of the tests individually, because sharing is not used to reduce the number of tests performed. The sequential algorithm is thus best suited for compliance/validation applications.

Another drawback of the sequential algorithm is that it is restricted by the size limitations of the programming language it utilizes. For example, in the Java programming language, created by Sun Microsystems Inc., of Santa Clara, Calif., code is stored in .class files, which are restricted in size. If the code for the ruleset exceeds this size, the sequential algorithm must decompose the code into multiple class files and chain them together, a level of complexity that generally causes a loss of efficiency.

A further drawback of the sequential algorithm is that it does not support conditions that operate on a set of objects. As noted above, examples of these conditions include the "exists," "not," and "collect" conditions. In order to process these types of conditions, the sequential algorithm would need to be extended, which would increase the algorithm's complexity and reduce efficiency.

The sequential algorithm does not manage loops on the dataset, and generally requires a tuple to be passed. The tuples are generally generated by loops that are outside of the sequential algorithm. The tuples generally reflect every possible combination of objects in the dataset. Because the loops exist outside of the algorithm, there is no way to share the loops for the rules that operate on the same subset of objects.

In view of the foregoing, it would be desirable to have a rule execution algorithm that does not evaluate tests unnecessarily.

It would also be desirable to have a rule execution algorithm that is scalable to handle large quantities of rules without having to chain files together.

It further would be desirable to have a rule execution algorithm that is portable to different software languages.

It would also be desirable to have a rule execution algorithm with a shorter runtime when processing data than currently available rule execution algorithms.

It further would be desirable to have a rule execution algorithm that can directly operate upon a rule engine's working memory without use of a tuple generator.

SUMMARY OF THE INVENTION

It is therefore an object of the present invention to provide methods and systems that compile rules together to reduce the number of loops and tests evaluated.

It is also an object of the present invention to provide methods and systems that are scalable to handle large quantities of rules without having to chain files together.

It is further an object of the present invention to provide methods and systems that are portable to different software languages.

It is also an object of the present invention to provide methods and systems that have a shorter runtime when processing data than currently available rule execution algorithms.

It is further an object of the present invention to provide methods and systems that directly operate upon a rule engine's working memory without use of a tuple generator.

In accordance with these and other objects of the present invention, methods and systems for a novel rule execution algorithm are described.

One embodiment of the present invention is designed to function with the Java software platform using the ILOG JRules software on a computer having a general purpose processor.

The present invention alleviates the problems associated with known rule execution algorithms. Accordingly, the present invention allows sharing between rules, which increases efficiency of the algorithm. Furthermore, the present invention is scalable to handle large quantities of rules without chaining files together, is portable to different software platforms, generally has a short runtime compared to currently available rule execution algorithms, and is able to directly operate upon a rule engine's working memory without use of a tuple generator.

BRIEF DESCRIPTION OF THE DRAWINGS

The above and other advantages of the present invention will become apparent upon consideration of the following detailed description, taken in conjunction with the accompanying drawings, in which like reference characters refer to like parts throughout, and in which.

DETAILED DESCRIPTION OF THE INVENTION

A rule can be translated to a sequence of loops and tests. This is shown in FIG. 1, which is an evaluation-tree representation of an exemplary rule.

Figure 1:
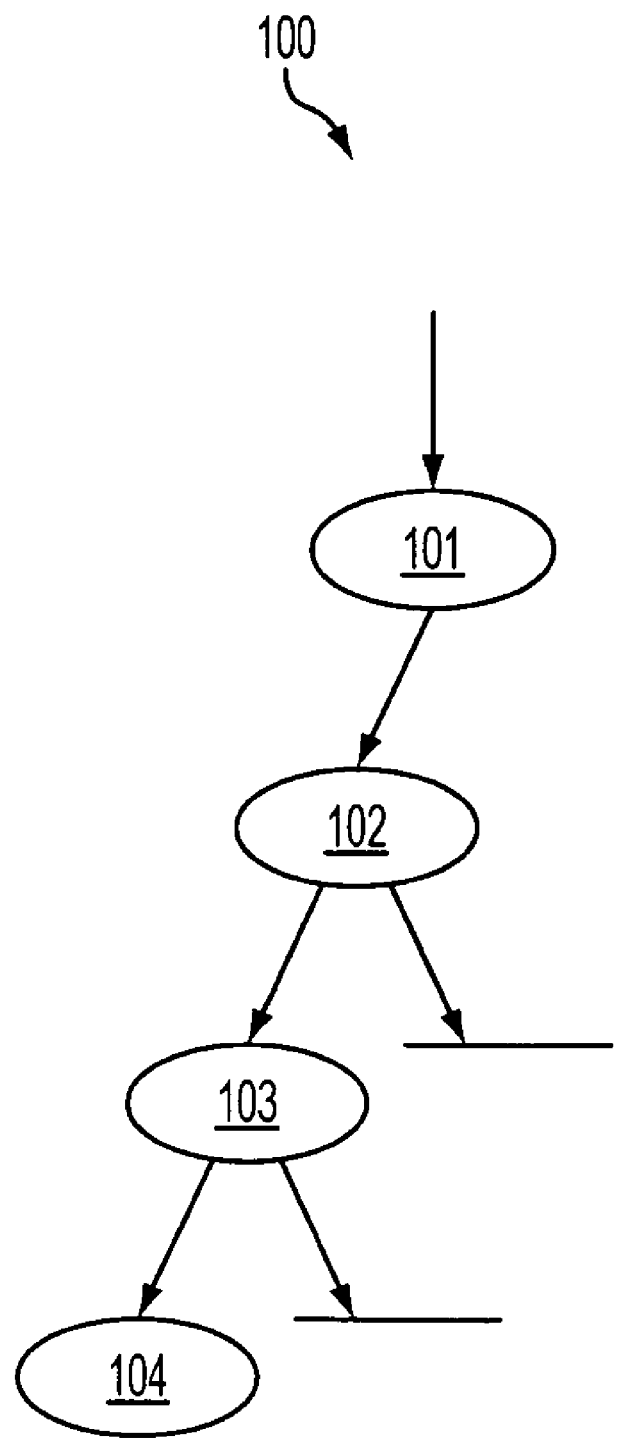
FIG. 1 is an illustrative evaluation-tree for an exemplary rule.

The exemplary rule shown in FIG. 1 is that customers purchasing cars with price between $10,000 and $20,000 sold at vendor Alpha receive 2% cash back. The tuple in this example consists of a single car object. Evaluation-tree 100 displays this rule, which is made up of loop 101 and tests 102 and 103. Loop 101 starts a loop on the car objects. When a car object is loaded, then the next step is to proceed to Test 102. Test 102 determines for the given customer object if the vendor field has the value "Alpha." If Test 102 is true, then the next step is to proceed to Test 103. If Test 102 is false, then the current car object does not comply with the rule and the next car object is considered. Test 103 determines for the given customer object if the value of the price field is between $10,000 and $20,000. If Test 103 is true, meaning all tests are true, then the action 104 of giving 2% cash back is executed. If Test 103 is false, then the current car object does not comply with the rule and the next car object is considered.

Figure 2:
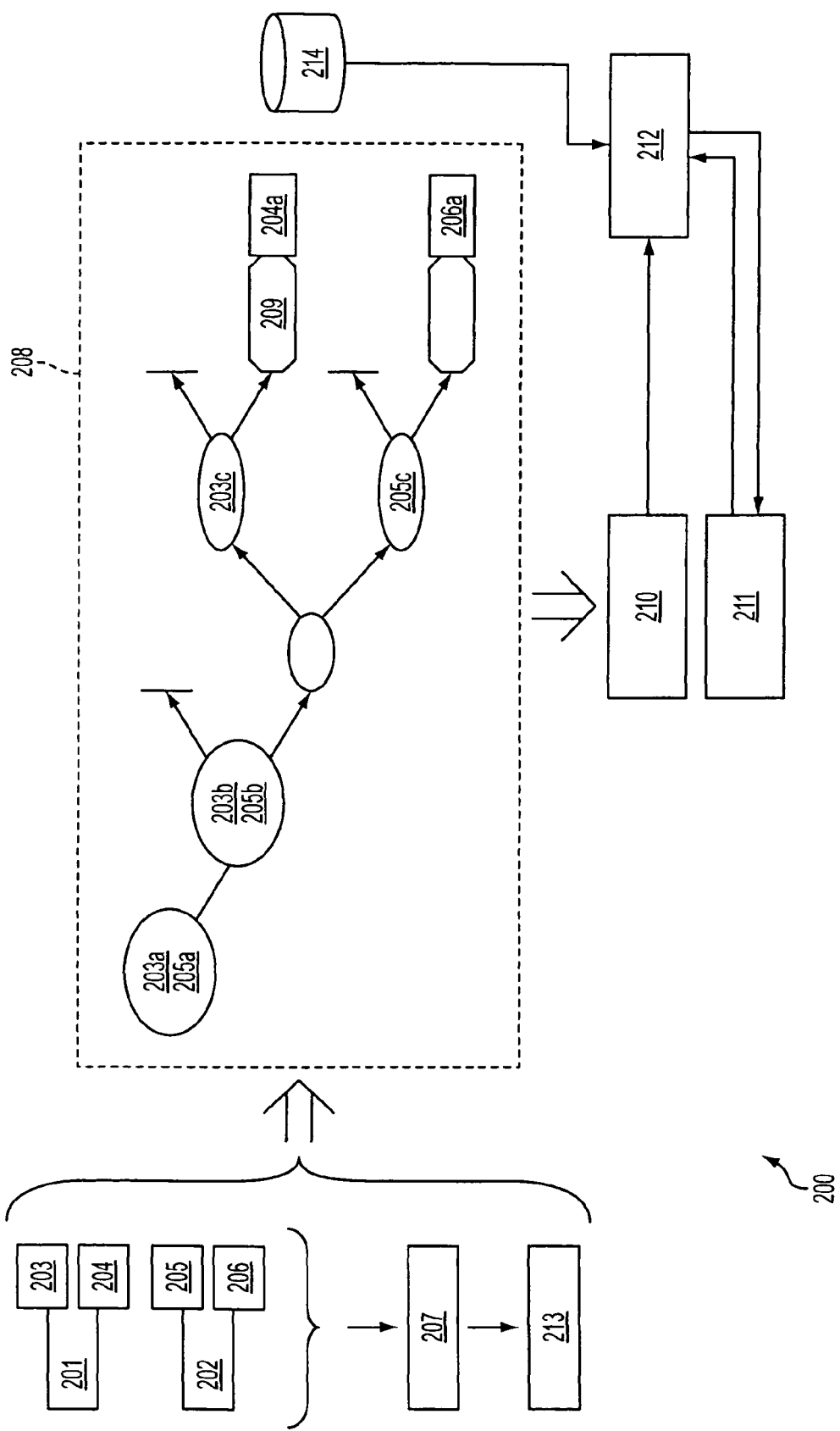
FIG. 2 is a functional diagram illustrating operation of an embodiment of a novel rule execution algorithm in accordance with the principles of the present invention.

FIG. 2 is a functional diagram illustrating operation of an embodiment of a novel rule execution algorithm 200 according to the principles of the present invention. The aforementioned limitations of conventional rule execution algorithms are generally overcome by the present invention in the following manner.

The exemplary ruleset shown here consists of two rules. Rule 201, composed of condition 203 and action 204, states that customers purchasing cars with price between $10,000 and $20,000 sold at vendor Alpha receive 2% cash back. The tuple for this rule consists of a single car object. Rule 202, composed of condition 205 and action 206, states that customers purchasing cars sold at vendor Alpha with style code "2," signifying a convertible, receive a free hard top. The tuple for this rule also consists of a single car object.

Before the novel rule execution algorithm is run, test analyzer 207 is used to determine the relationships between all of the tests contained in the conditions of the rules in the given ruleset. Test analyzer 207 determines the relationships between the tests in the ruleset and temporarily stores these relationships for later use.

For example, a given ruleset may have five single-condition rules, each condition containing two tests: (1) if the name is Roger and age >10, (2) if the name is Roger and age <=10, (3) if the name is roger and age >20, (4) if the name is Lucie and age=15, and (5) if the name is Lucie and age=20. Test analyzer 207 used in the preferred embodiment described below would infer that for the first three conditions, the tests on name are equivalent. Test analyzer 207 would similarly identify that the age tests in conditions (1) and (2) are complementary. In this example it would also infer the following relationships: disjoint between the name tests in conditions (1)-(3) and (4), subsumption between the age tests in conditions (1) and (3), disjoint between the age tests in conditions (2) and (3), disjoint between the age tests in conditions (3) and (4), equivalence between the name tests in conditions (4) and (5), and disjoint between the age tests in conditions (4) and (5). Each of these relationships would be temporarily stored into data structure 213 for later use by the rule execution algorithm. The form in which the relationships are temporarily stored can vary without affecting the operation of the present invention. One example of how the relationships may be stored is in the RAM of a computer.

Test analyzer 207 in the preferred embodiment of the present invention is a syntactic and semantic analysis coupled with normalization techniques. One skilled in the art would recognize that test analyzer 207 could test for a number of different relationships. In the preferred embodiment of the present invention, five relationships between the tests are temporarily stored in data structure 213: equivalence, complement, subsumption, disjoint, and unrelated. It is further preferred to use the test analyzer contained in version 6.1.2 of JRules software sold by ILOG, Inc. For a more detailed description of these relationships, please see the discussion corresponding to FIGS. 3-6.

The novel rule execution algorithm of the present invention operates by first translating each individual rule to a coded series of one or more loops and tests, which can be graphically represented as a sequential evaluation-tree. The coded loops and tests of the first two rules are then unified into a single set of code. For the tests, the unification is performed based upon the relationships between the tests within the rules, which are recalled from data structure 213. For the loops, the unification is performed when the datasets the loops iterate on are equivalent. Please see FIGS. 3-6 and the accompanying discussion, which illustrate unification of rules based upon the preferred relationships.

The resultant code representing the previously unified rules is then unified with the next unprocessed rule's coded loops and tests. This process is continued until the entire ruleset is integrated into a single set of code, graphically represented as unified evaluation-tree 208, having an organized series of nested loops and tests. Loop 203a represents the loop on the car objects, 203b and 203c correspond to the tests from rule 201 on vendor and price, respectively, and action 204a corresponds to action 204. Similarly, loop 205a represents the loop on the car objects, 205b and 205c correspond to the tests from rule 202 on vendor and style code, respectively, and action 206a corresponds to action 206. The configuration of unified evaluation-tree 208 is explained in the discussion corresponding to FIG. 6.

While the unification process could be performed manually, this is not practical when large numbers of rules are involved, and can be highly time consuming. The present invention is desirable because the unification process may be performed transparently without user invention, resulting in greater efficiency.

In an embodiment of the present invention, it is possible to activate or deactivate rules before the actions associated with a given rule are performed. In this embodiment, a check, referred to as an activation guard test, is done to determine whether or not the rule is active. If the activation guard test 209 is true, then action 204 is taken when condition 203 of rule 201 is met. If activation guard test 209 is false, then rule 201 is deactivated and action 204 is not performed even if condition 203 is met. This might be done when it is desirable to undertake the unification process only once and use the unified evaluation-tree 208 over an extended period of time. An example of this would be if a retailer that wished to offer a sale, corresponding for instance to rule 201, for a limited time. When the retailer wanted the sale to be active, he could activate rule 201. Once the sale ended, the retailer could simply deactivate rule 201, instead of removing rule 201 from the ruleset and repeating the unification process. This provides an advantage in circumstances where it may be undesirable to repeat the unification process.

In the second compilation step of the preferred embodiment of the novel rule execution algorithm, the loops and tests of unified evaluation-tree 208 are translated into a pattern matching code 210 for evaluation by a virtual machine ("VM") 212, and a satellite code that provides basic scripting services for pattern matching code 210. Pattern matching code 210 utilizes the services the satellite code provides through the use of indexes. As the unified eval-tree is compiled into pattern-matching code during the second compilation step, the novel rule execution algorithm generates the satellite code as indexed pieces of code that provide the necessary services. The satellite code at this stage remains platform neutral.

After it is generated, the satellite code is adapted to the target platform in a second step. Using a translator, which is known to one skilled in the art, the satellite code is translated into auxiliary code for use by VM 212. In the preferred embodiment of the present invention, the satellite code is translated to Java byte code using a byte code generator. The indexes of the services are not altered during the translation into auxiliary code, thereby maintaining transparency for use by the pattern matching code.

Pattern matching code 210 is a pseudo code representation of the unified evaluation-tree that can be read by VM 212 during the runtime of the novel rule execution algorithm. In computer science, a VM generally designates a program capable of interpreting certain codes. In the preferred embodiment, VM 212 is written in Java. The VM of the present invention can be programmed to process code dedicated to rule execution, and can also be programmed to iterate for (e.g., search for) objects in the Working Memory ("WM") of the rule engine. One skilled in the art would recognize that the VM used by the novel rule execution algorithm can be written in many other programming languages. Use of pattern matching code 210 is generally advantageous compared to translating rules directly into known programming languages because it is not restricted in size. This overcomes the scalability problems in known programming languages, where the number of lines of code per class may be restricted. In the preferred embodiment, pattern matching code 210 is an int code, rather than a byte code. One skilled in the art would recognize however that pattern matching code 210 could be implemented in byte code and still function consistently with the principles of the present invention.

For example, a portion of pattern matching code 210 of the following form may be written:

```
0      PUSH-MEMORIES(0)
1      PUSH-STORE(theCars)
2      VALUE-FOREACH(TUPLE[0],Object[ ]) exit:@17
3      TYPE-JUMP(TUPLE[0],Car) false:@16
4      PUSH-VALUE(this.weight)
5      TABLE-JUMP(1000) {
           0:@7
           1:@11
       }
6      JUMP @15
7      POP-VALUE
8      TEST-JUMP(this.vendor.equals(Alpha))
       false:@16
9      RULE-THEN(R1)
10     JUMP @16
11     POP-VALUE
12     TEST-JUMP(this.vendor.equals(Beta)) false:@16
```

-continued

```
13     RULE-THEN(R2)
14     JUMP @16
15     POP-VALUE
16     VALUE-NEXT(TUPLE[0]) loop:@3
17     POP-STORE
18     POP-MEMORIES
19     END
```

This exemplary pattern matching code includes the implementation of exemplary rules R1, which states that when a car object weighs 1000 kilograms and is sold by vendor "Alpha," then the actions A1 are executed, and R2, which states that when a car object weighs 1001 kilograms and is sold by vendor "Beta," then the actions A2 are executed.

The first line of the exemplary pattern matching code above instructs the VM to not allocate memory for discrimination tests. When join tests exist, the "push-memories" code allocates local memory for discrimination tests. Here, because no join tests are in the example ruleset, the allocation is 0. The next line above instructs the VM to load the set of car objects from the WM to the top of the interpretation stack, which is part of the VM, using the "push-store" command.

Line 2 of the exemplary pattern matching code commences an iterative loop on the car objects in the interpretation stack. Each car object is assigned to the 0th position of the tuple variable for processing by the pattern matching code. The first line of the exemplary pattern matching code also indicates that after the last car object has been processed, the loop will "exit" by going to line 17 of the pattern matching code.

Line 3 of the exemplary pattern matching code instructs the VM to delegate to the auxiliary code the test of whether the current tuple is of the Car class or not using the "type-jump" code. The "TUPLE[0],Car" code in line 3 is a text representation of the auxiliary code index for this test, which is further discussed below. If the car type test is true, then the VM proceeds to line 4 of the pattern matching code. Line 3 also instructs the VM that if the car type test is false, the loop is to go to line 16 of the pattern matching code.

Line 4 of the exemplary pattern matching code instructs the VM to delegate to the auxiliary code accessing the weight field value of the current tuple using the "push-value" code. The "this.weight" code in the line is a text representation of the auxiliary code index for accessing the weight field value. When the weight field value is returned by the auxiliary code, the "push-value" code loads the weight field value onto the top of the interpretation stack.

Line 5 of the exemplary pattern matching code instructs the VM to subtract 1000 from the value on the top of the interpretation stack using the "table-jump(1000)" code. "Table-jump" also acts as a "switch" statement testing the data at the top of the interpretation stack against the values 0 and 1. When equality is found between the value on the top of the interpretation stack and one of these values, the VM advances to the prescribed line in the pattern matching code. For exemplary rule R1, when the weight field value is equal to 1000 for the current tuple, the VM proceeds to line 7 of the pattern matching code. For exemplary rule R2, when the weight field value is equal to 1001 for the current tuple, the VM advances to line 11 of the pattern matching code. If the value on the top of the interpretation stack does not equal 1000 or 1001, then the VM proceeds to line 6, which uses the "jump" code to instruct the VM to advance to line 15 of the pattern matching code.

By using the "pop-value" code in line 7 of the exemplary pattern matching code, the pattern matching code instructs the VM to remove the weight field value for the current tuple from the top of the interpretation stack. The VM then executes line 8, which uses the "test-jump" code to instruct the VM to call the auxiliary code to test whether or not the vendor field value is "Alpha." The code this.vendor.equals(Alpha) in line 8 is a text representation of the auxiliary code index for this test. If the value returned is false, then line 8 instructs the VM to advance to line 16 of the pattern matching code. If the value returned is true, then every test of R1 has been satisfied and the actions of the rule must be executed. This is done in line 9, where the VM is instructed by the "rule-then" code to call the auxiliary code to execute actions A1. The code R1 corresponds to a section of the auxiliary code that performs A1. The VM then continues to line 10 of the pattern matching code, which tells the VM to advance to line 16 of the pattern matching code using the "jump" code.

By using the "pop-value" code in line 11 of the exemplary pattern matching code, the pattern matching code instructs the VM to remove the weight field value for the current tuple from the top of the interpretation stack. The VM then executes line 12, which uses the "test-jump" code to instruct the VM to call the auxiliary code to test whether or not the vendor field value is "Beta." The code this.vendor.equals(Beta) in line 12 is a text representation of the auxiliary code index for this test. If the value returned is false, then line 12 instructs the VM to advance to line 16 of the pattern matching code. If the value returned is true, then every test of R2 has been satisfied and the actions of the rule must be executed. This is done in line 13, where the VM is instructed by the "rule-then" command to call the auxiliary code to execute actions A2. The code R2 corresponds to a section of the auxiliary code that performs A2. The VM then proceeds to line 14 of the pattern matching code, which tells the VM to advance to line 16 of the pattern matching code using the "jump" code.

Line 15 of the exemplary pattern matching code is then executed by the VM, and the value at the top of the interpretation stack is removed by using the "pop-value" code.

Line 16 of the exemplary pattern matching code instructs the VM to obtain the next car object from the interpretation stack, load it into 0th position of the tuple for processing by the pattern matching code, and return to line 3 of the pattern matching code.

If there are no more car objects to process, then the for loop is complete. Line 17, which instructs the VM to remove the set of car objects from the interpretation stack using the "pop-store" code, is then executed. Line 18 of the exemplary pattern matching code instructs the VM to de-allocate the local memory allocated in line 0 using the "pop-memories" code. Line 19 ends the execution of the pattern matching code using the "end" code.

The "binary-jump" code, not included in the above example, acts as a "switch" statement testing numeric data at the top of the interpretation stack of the VM against constant numeric values. "Binary-jump" may also test the numeric data at the top of the interpretation stack against constant numeric intervals. These numeric intervals can either describe a range of numeric values, such as [0 . . . 12], for example, or they can describe an enumerated list of values, such as {1,2,15.42,45,8}, for example. Unlike the "table-jump" code, the "binary-jump" code may be used to process non-contiguous values or intervals.

The "hash-jump" code, not included in the above example, acts as a "switch" statement testing the data at the top of the interpretation stack against constants that may be hashed. Hashing is a technique to classify objects that is known to one skilled in the art. Hashable constants are generally strings or dates.

Auxiliary code 211, which is distinct from the pattern matching code, is generated as part of the present invention to manipulate objects and execute rule actions, which pattern-matching code 210 does not do. In the preferred embodiment of the present invention, the auxiliary code is used to test an object's type, obtain a field value from an object, test an object or a group of previously matched objects, and execute rule actions. The auxiliary code is linked to the pattern matching code by unique indexes assigned to the auxiliary code corresponding to each test or action. This is observed in the exemplary pattern matching code described above, where the "push-value," "type-jump," "test-jump," and "rule-then" commands all reference auxiliary code indexes in their parentheticals. A benefit of this indexing system generally is that the auxiliary code may be altered (i.e. changed to a different programming language) without changing the pattern matching code as long as the indexes are not altered.

In the preferred embodiment of the present invention, auxiliary code 211 is generated in Java byte code and stored in Java class files. Java source code is generally not generated. The present invention is not limited to this embodiment and may be written in any language, such as, for instance, in Microsoft .NET Intermediate Language ("MSIL"), developed by Microsoft Corp., of Redmond, Wash.

For example, a portion of auxiliary code 211 of the following form may be written:

```
boolean getTest(int index) {
    switch (index) {
    case 0:
        Person p = (Person)(machine.tuple[0]);
        return (p.age > 10);
    case 1:
        Person p = (Person)(machine.tuple[0]);
        return (p.age > 20);
    case 2:
        . . .
    }
}
```

This code can be called by VM 212 and passed an integer value. This call may be based on an integer piece of data that VM 212 passes to "getTest." When "getTest" is called, a variable named "index" is assigned the integer value. The switch statement evaluates "index." If "index" equals zero, then the code block in case 0 is executed and the code will assign an object to a variable p. The code will then return a boolean value of true or false, depending on whether field named "age" within the assigned object contains a value greater than 10. If "index" does not equal zero, the code will test the next case. If "index" equals one, then the code block in case 1 is executed and the code will assign an object to a variable p. The code will then return a boolean value of true or false, depending on whether the field named "age" within the assigned object contains a value greater than 20. If the case of "index" has not yet been matched, the code will proceed through any additional cases to be tested, indicated in this example by the "case 2 . . . " code. Thus, by using auxiliary code the VM 212 combined with the pattern matching code can effectively and efficiently manipulate and test data without requiring large built-in test and value evaluations.

Once the previous two compilation steps (i.e. generating a single set of code from the ruleset and translating the single set of code into pattern matching code 210 and auxiliary code 211) are performed, the runtime of the novel rule execution algorithm is started when the user triggers the pattern matching algorithm using an access interface. In the preferred embodiment of the present invention, the access interface is a software application programming interface ("API").

VM 212 then executes structured pattern-matching code 210, which performs the tests from the applicable rules on the objects in the dataset. The objects are obtained from working memory 214 in the preferred embodiment of the present invention. One skilled in the art would recognize that working memory 214 is exemplary, and may be substituted with any data structure. Whenever a test or a value is needed, VM 212 calls auxiliary code 211 to perform the test and return the necessary values.

The present invention is generally advantageous over known rule execution algorithms because the unification process leads to optimized loops that eliminate the unnecessary tests that are executed in the sequential algorithm, generally resulting in greater efficiency and a faster runtime. The present invention generally is especially advantageous at optimizing loops that operate on the same objects.

The present invention also has the advantage of high portability, because the virtual machine and pattern matching code are independent of software platform. Use of int code and a VM avoid the scalability problems of the sequential algorithm, where efficiency is lost because the code must be broken into chained classes. Also, because a RETE network is not generated at runtime, the present invention can handle many more rules than the RETE algorithm. Also, the present invention is able to operate upon a rule engine's working memory without use of a tuple generator, resulting in greater efficiency than the sequential algorithm.

The compilation time for the present invention in many cases may be longer than known rule execution algorithms. However, because the compilation time only occurs once and the runtime occurs for every execution request, this is not generally a significant disadvantage.

As discussed above, during the compilation phase of the present invention, the coded loops and tests of the individual rules are unified into a single set of code, starting with the first two rules in the ruleset. Before the present invention starts unifying tests, it is preferred the conditions of the rules are examined to determine if they operate upon the same class or not. For instance, two exemplary rules may be expressed in the following form:

```
Rule R1 {                    Rule R2 {
   when { Person( ); }          when { Person( ); }
   then { <actions of R1>       then { <actions of R2>
}                            }
}                            }
```

These rules contain "simple" conditions, stating that if the object tested is from the "Person" class, then the corresponding actions are to be performed. Translating the two exemplary rules into loops yields the following pseudo code:

```
R1:Foreach Person of the WM      R2:Foreach Person of the WM
{                                {
   <actions of R1>                  <actions of R2>
}                                }
```

Because the two exemplary conditions operate upon the same class, the unification of these two conditions under the present invention contains a shared loop, expressed in pseudo code of the following form:

```
R1 U R2:Foreach Person of the WM {
   <actions of R1>
   <actions of R2>
}
```

The sharing of loops as implemented in the present invention yields greater efficiency than the sequential algorithm, where two separate loops would have to be executed.

If the conditions of the two rules that are being unified operate on different classes, under the present invention the loops are not unified and are executed sequentially. For instance, two exemplary rules may be expressed the following form:

```
Rule R1 {                    Rule R2 {
   when { Person( ); }          when { Account( ); }
   then { <actions of R1>       then { <actions of R2>
}                            }
}                            }
```

Rule R1 here operates on the "Person" class, while rule R2 operates on the "Account" class. Therefore, the pseudo code for these two rules, executed in sequence, would be in the following form:

R1 U R2:

```
Foreach Person of the WM {
   <actions of R1>
}
Foreach Account of the WM {
   <actions of R2>
}
```

As stated above, there are five test unification rules in the preferred embodiment of the present invention: equivalence, complement, subsumption, disjoint, and unrelated. When two rules have tests that are equivalent, the test is executed only once, whereas in a sequential rule execution algorithm the test would be performed twice, once for each rule. The reduction in number of tests executed generally results in greater efficiency.

Figure 3:
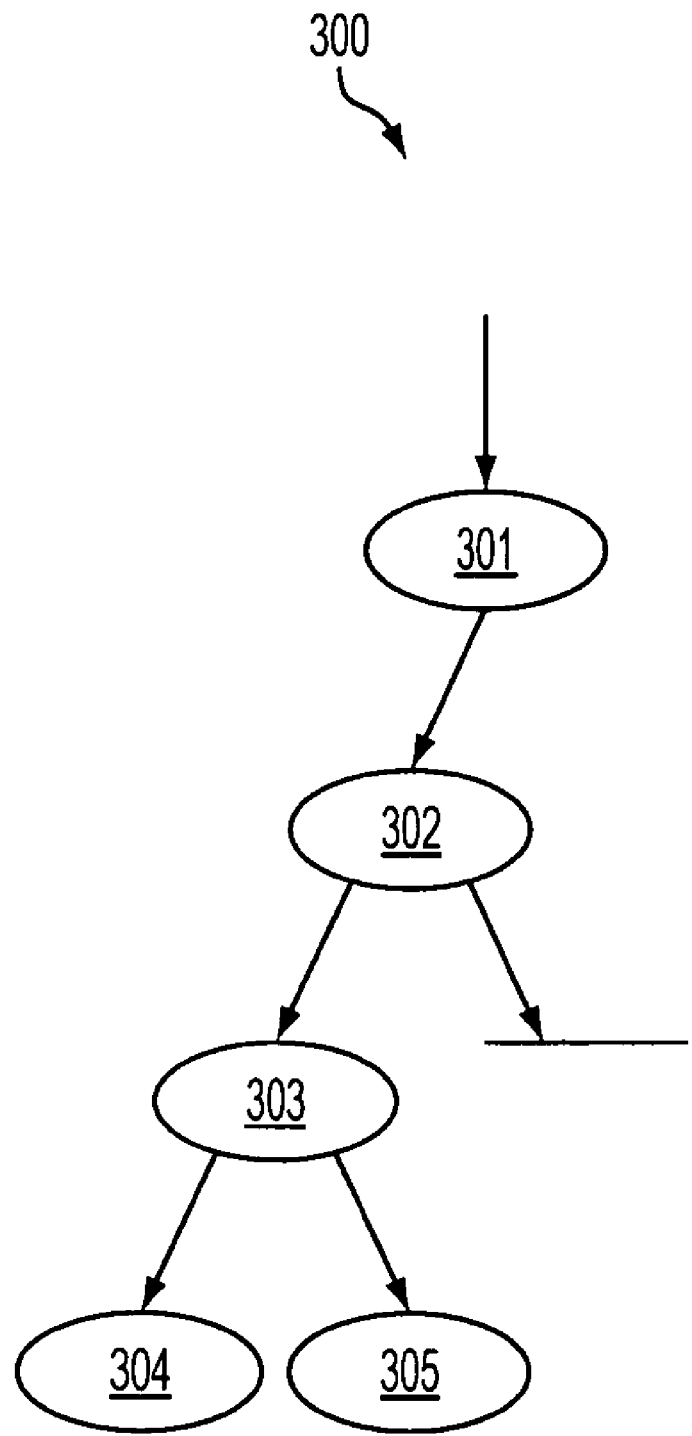
FIG. 3 is an illustrative evaluation-tree of the unification of two rules displaying a complementary relationship.

FIG. 3 illustrates the unification of two complementary tests in accordance with the principles of the present invention. There are two exemplary rules unified in FIG. 3. The first rule states that if a car is sold by vendor Alpha and the weight is less than 1000 kilograms, then the vendor marks up the price of the car by 5%. The second rule states that if a car is sold by vendor Alpha and the weight is greater than or equal to 1000 kilograms, then a 2% cash back promotion is given to the customer. The loop on the car objects and test on the vendor field value are equivalent in the two rules, and in accordance with the equivalence unification rule discussed above are only performed once. In FIG. 3, the car object loop and the vendor field value test are represented at nodes 301 and 302 respectively.

When two tests are complementary, they are unified into a single test, with actions resulting from either outcome of the test. This is shown in FIG. 3, as only test 303, which determines if the weight field value is less than 1000, is applied. In a sequential rule execution algorithm, there would instead be two separate tests checking the weight field value to determine first if it was less than 1000, and then if it was greater than or equal to 1000.

When the outcome of Test 303 is true, then Action 304, increasing the price field value by 5%, is executed. When the outcome of Test 303 is false, meaning the weight field value is equal to or greater than 1000, then Action 305, giving 2% cash back to the customer, is executed. As noted above, this test unification prevents the novel rule execution algorithm from running the two aforementioned tests on the weight object separately, generally resulting in greater efficiency than the sequential algorithm.

Figure 4:
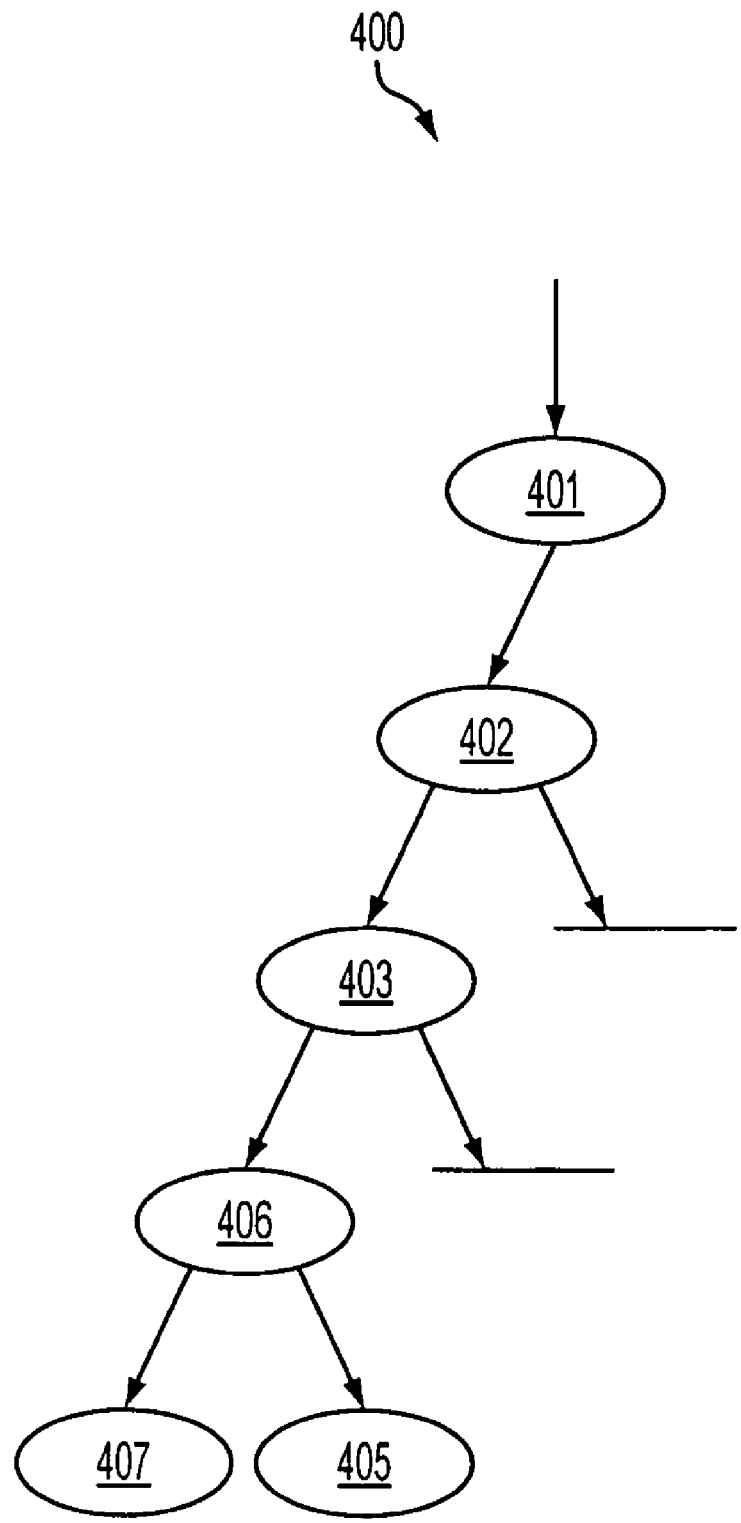
FIG. 4 is an illustrative evaluation-tree of the unification of two rules displaying a subsumptive relationship.

FIG. 4 is an evaluation-tree representing the unification of two rules with tests exhibiting a subsumptive relationship. The first exemplary rule in FIG. 4 is if a car is sold by vendor Alpha and has a price between 0 and $40,000, then the customer gets zero percent financing. The second exemplary rule in FIG. 4 is if a car is sold by vendor Alpha and has a price between $10,000 and $20,000, the customer receives 2% cash back. The loop on the car objects and the test on the vendor field value are equivalent in the two rules, and in accordance with the equivalence unification rule discussed above are only performed once. In FIG. 4, the car object loop and the vendor field value test are represented at nodes 401 and 402 respectively.

The price field value tests of the first and second rules in FIG. 4 have a subsumptive relationship, where the price field value test for the first test 403 is the supertest and the price field value test for the second test 406 is the subtest. As FIG. 4 illustrates, supertest 403, which determines if the price field value is between 0 and 40,000, is applied first in accordance with the unification rule for subsumption. If supertest 403 is true, then, and only then, is subtest 406 applied. If supertest 403 is false, then the current car object does not comply with any of the rules and the next car object is considered. If subtest 406 is true, then sequence node 407 is executed, meaning that the action from the first exemplary rule, giving 0% financing to the customer, and then the action from the second exemplary rule, giving 2% cash back to the customer, are executed sequentially. If the conditions of subtest 406 are not met, then only action 405 from the first exemplary rule, giving 0% financing to the customer, is executed. Under the subsumptive test unification rule of the present invention, the subtest is therefore only run in cases where the supertest is true. This results in fewer tests applied and greater efficiency than a sequential rule execution algorithm, where both the supertest and the subtest are applied, even when the supertest is false.

Figure 5:
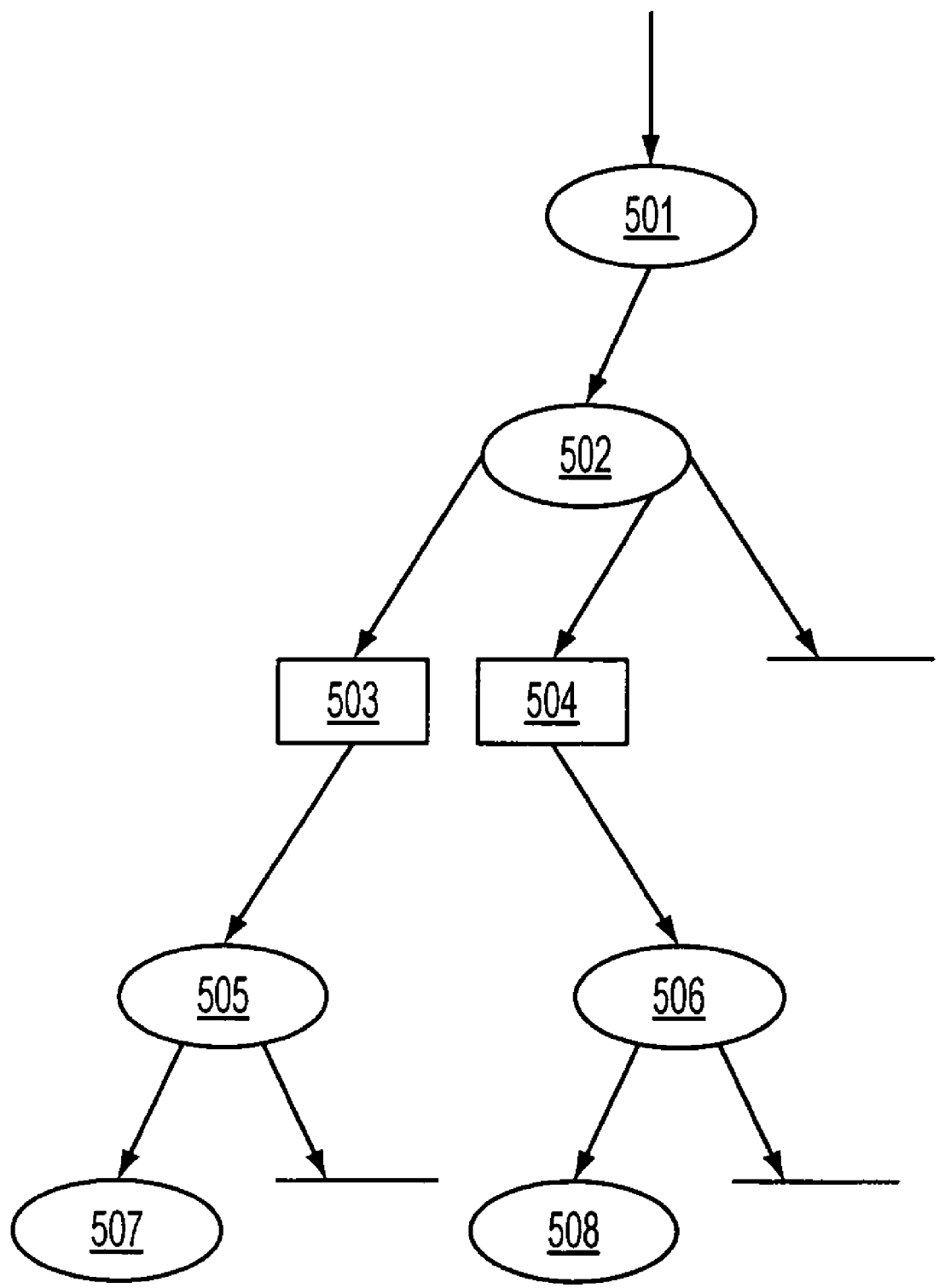
FIG. 5 is an illustrative evaluation-tree of the unification of two rules displaying a disjoint relationship.

FIG. 5 illustrates the unification of two rules with tests that have a disjoint relationship. A disjoint relationship describes the situation where the actions are triggered by mutually exclusive field values. In FIG. 5, two rules are unified. The first exemplary rule is that when a car is sold by vendor Alpha and has a weight less than 1000 kilograms, then the price field value is increased by 5%. The second exemplary rule states that when a car is sold by vendor Beta and has a weight greater than or equal to 1000 kilograms, then 2% cash back is given to the customer.

Node 501 represents the loop on the car objects that is common to both of the aforementioned rules. For each car object, the next test is performed upon the vendor field value. The rules contain tests that are disjoint as to the vendor field value, and this is displayed at switch node 502. If the outcome of disjoint test 502 is that the vendor field value 503 is "Alpha," then predicate test 505 is executed, meaning that the weight field value is tested to determine if it is less than 1000. If predicate test 505 is true, then action 507 is executed and the price field value is increased by 5%. If predicate test 505 is false, then the current car object does not comply with the rule and the next car object is considered. If the outcome of disjoint test 502 is that the vendor field value 504 is "Beta," then predicate test 506 is executed, meaning that the weight field value is tested to see if it is greater than or equal to 1000. If predicate test 506 is true, then action 508 is performed and 2% cash back is given to the customer. If predicate test 506 is false, then the current car object does not comply with the rule and the next car object is considered. This represents an efficiency improvement over sequential rule execution algorithms, which would instead execute separate tests on whether the vendor field value was "Alpha" and whether the vendor field value was "Beta" in sequence.

Figure 6:
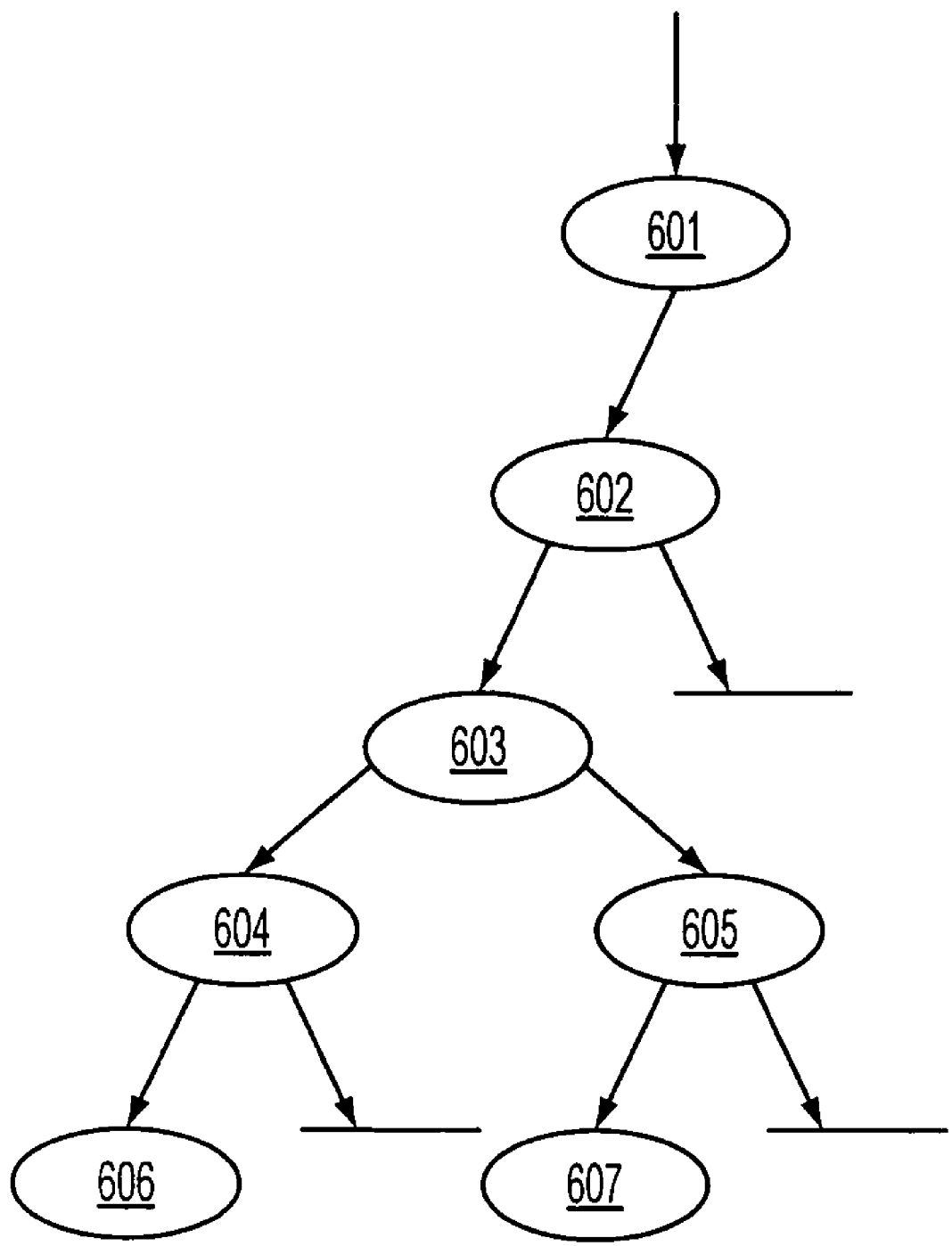
FIG. 6 is an illustrative evaluation-tree of the unification of two unrelated rules.

FIG. 6 illustrates the unification of two rules with tests that are unrelated. Tests are unrelated when they test different objects or different fields of the same object. When the test analyzer detects no relationship, the tests may be performed sequentially, as in a sequential rule execution algorithm. FIG. 6 illustrates the unification of two exemplary rules. The first rule states that if a car is sold by vendor Alpha and has a price between $10,000 and $20,000, the customer receives 2% cash back. The second rule states that if a car is sold by Alpha and has a weight less than 1000 kilograms, then offer a free 4-year warranty.

Nodes 601 and 602 are common to both rules; they correspond to the loop on the car objects and the test to see if the vendor object's value is "Alpha," respectively. Because the tests on price and weight are unrelated, they are performed in sequence, which is represented at sequence node 603. First, test 604 tests to see if the price field value is between 10,000 and 20,000, and if the test is true, then action 606 is performed and 2% cash back is given to the customer. If test 604 is false, then the current car object does not comply with the rule. Next, test 605 tests to see if the weight field object is less than 1000, and if the test is true, then action 607 is performed and a free 4-year warranty is given to the customer. If test 605 is false, then the current car object does not comply with the rule and the next car object is considered.

Applying the relationships discussed to the following example, the unified evaluation-tree of the present invention can be generated as described below. For this example, a ruleset of five rules, each with a single condition, will be used, containing the following five conditions discussed in the context of the test analyzer of FIG. 2: (1) if the name is Roger and age >10, (2) if the name is Roger and age <=10, (3) if the name is roger and age >20, (4) if the name is Lucie and age=15, and (5) if the name is Lucie and age=20. In the first compilation step of the novel rule execution algorithm, as applied to this exemplary ruleset, rules (1) and (2) are unified. Pseudo code illustrating this unification U1 may be written in the following form:

```
1    U1:Foreach p in Person {
2        if (p.name.equals("Roger"))
3            if (p.age > 10)
4                Action1(p);
5            else
6                Action2(p);
7    }
```

The first line in this code signifies a loop that executes the subsequent unification for every object p in the Person class. Because both rules (1) and (2) operate on the Person class, this loop is the result of the unification of the individual loops of rule (1) and (2). The code then uses the conditional statement in the second line to determine if the name field value has the value "Roger." This test is equivalent in rules (1) and (2), and therefore is executed only once. In line 3, the code executes the test determining if the age field value is greater than 10. If the age test is true, then Action1, the actions corresponding to rule (1), is performed. If the age test is false, then Action2, the actions corresponding to rule (2), is performed. Because the age tests in conditions (1) and (2) are complementary, only one test needs to be performed in accordance with the unification rules described above.

The next step in the unification process of the present invention for this example is unification of U1, the unification of rules (1) and (2), with rule (3). Pseudo code illustrating this unification U2 may be written in the following form:

```
1    U2:Foreach p in Person {
2        if (p.name.equals("Roger"))
3            if (p.age > 10)
4                if (p.age > 20)
5                    Action1(p);
6                    Action3(p);
7                else
8                    Action1(p);
9            else
10               Action2(p);
11   }
```

The first three lines in U2 are identical to those lines in U1 and operate in the same manner. If the age test in the third line of U2 is true, then line 4 of U2 is executed. This indicates the subsumptive relationship between the age tests of rule (1) and rule (3). Line 4 is the age test of rule (3), which determines if the age field value of p is greater than 20. It is nested within the "if" statement corresponding to the age test of rule (2) because the age test of rule (3) is the subtest of the age test of condition (2). If the age test in line 4 of U2 is true, then Action1 and Action3 (the actions corresponding to rule (3)) are executed sequentially. If the age test in line 4 of U2 is false, then only Action1 is executed. If the age test in the third line of U2 is false, then, as in U1, Action2 is executed. In accordance with the unification rules described above, one can see that fewer tests are required for the unified evaluation-tree represented above than if every test for rules (1)-(3) was executed sequentially.

The next step in the unification process of the present invention for this example is unification of U2, the unification of rules (1)-(3), with rule (4). Pseudo code illustrating this unification U3 may be written in the following form:

```
1    U3:Foreach p in Person {
2        switch (p.name) {
3        case "Roger":
4            if (p.age > 10)
5                if (p.age > 20)
6                    Action1(p);
7                    Action3(p);
8                else
9                    Action1(p);
10           else
11               Action2(p);
12           break;
13       case "Lucie":
14           if (p.age == 15)
15               Action4(p);
16           break;
17       }
18   }
```

The first line of U3 is identical to those seen in U1 and U2, and operates in the same manner. The second line of U3 corresponds to the disjoint relationship between the name tests in rules (1)-(3) and rule (4). A "switch" test is used instead of sequential "if" tests because the name field values are mutually exclusive cases, and are therefore disjoint. If the name field value of p has the value "Roger," then, as indicated in lines 4-12, the code functions the same as it did in U3. The "break" in line 12 of U3 signifies the end of the case of the switch. If the name field value of p is found to have the value "Lucie" at line 2 of U3, then lines 4-12 are not executed and execution resumes at line 14 of U3. Line 14 of U3 corresponds to the age test of rule (4) and tests to see if the age field value of p is 15. If the test at line 14 of U3 is true, then Action4, the actions corresponding to rule (4), is executed. If the test at line 14 is false, then the case of the switch ends, as signified by the "break" command at line 16 of U3. In accordance with the unification rules described above, one can see that fewer tests are required for the unified evaluation-tree represented above than if every test for rules (1)-(4) was executed sequentially.

The last step in the unification process of the present invention for this example is unification of U3, the unification of rules (1)-(4), with rule (5). Pseudo code illustrating this unification U4 may be written in the following form:

```
1    U4:Foreach p in Person {
2        switch (p.name) {
3        case "Roger":
4            if (p.age > 10)
5                if (p.age > 20)
6                    Action1(p);
7                    Action3(p);
8                else
9                    Action1(p);
10           else
11               Action2(p);
12           break;
13       case "Lucie":
14           switch (p.age) {
15           case 15:
16               Action4(p);
17               break;
18           case 20:
19               Action5(p);
20               break;
21           }
22           break;
23       }
24   }
```

Lines 1-13 of U4 function exactly the same as the corresponding lines in U3. The "switch" test in line of U4 corresponds to the disjoint relationship between the age tests of rules (4) and (5). The "case 15" statement in line 15 of U4 is the age test from rule (4), and if the test is true then Action4 is executed. If the test in line 15 is false, then the "case 20" statement in line 18 is executed, corresponding to the age test from rule (5). If the test in line 18 is true, then Action5, the actions corresponding to rule (5), is executed. If the test in line 18 is false, then the case of the inner switch ends, as signified by the "break" command in line 22 of U4. U4 is a single set of code representing the unification of the five rules in the given example. In accordance with the unification rules described above, one can see that fewer tests are required for the unified evaluation-tree represented above than if every test for rules (1)-(5) was executed sequentially. It is understood that large numbers of tests may be unified in the manner described above, and that the intermediate code structures for a common set of rules may vary if the rules are unified in a different order (e.g., loops may be generated differently if a group of tests is unified later in the process rather than earlier in the process, etc.).

Figure 7:
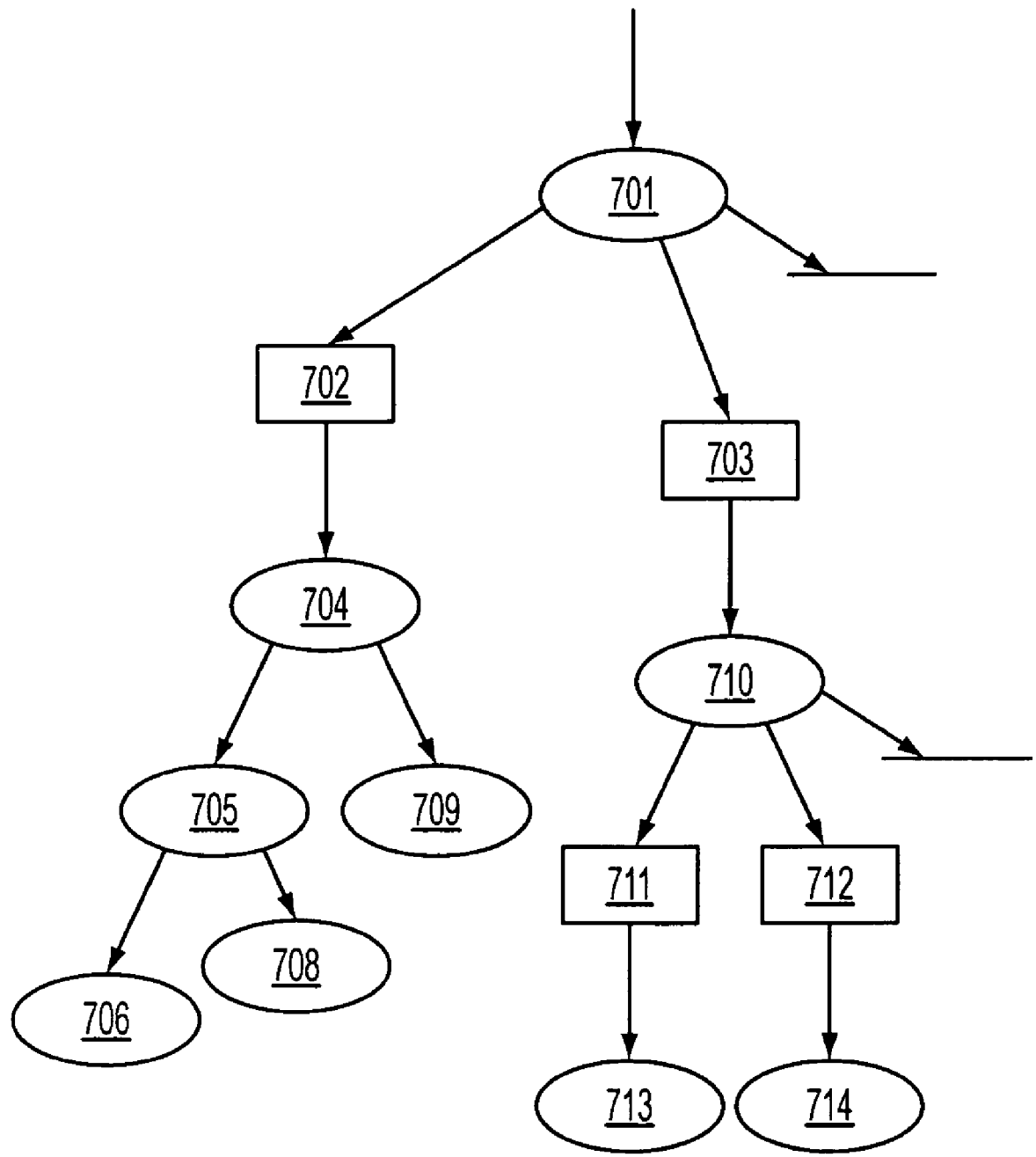
FIG. 7 is an illustrative evaluation-tree of five exemplary rules.

FIG. 7 is an evaluation-tree representation of the unified ruleset U4 described above. Node 701 represents the disjoint relationship between the name field value tests described above as the "switch" statement in line 2 of U4. Location 702 represents case "Roger" from line 3 of U4, and location 703 represents case "Lucie" from line 13 of U4.

Test 704 is the age field value test from line 4 of U4. If test 704 is true, then test 705, the age field value test from line 5 of U4, is executed. If test 705 is true, then sequential node 706 is executed, and Action1 and Action3 are executed sequentially, as is seen in lines 6-7 of U4. If test 705 is false, then only Action1 708 is executed, in accordance with lines 8-9 of U4. If age field value test 704 is false, then Action2 709 is executed in accordance with lines 10-11 of U4.

Node 710 represents the disjoint relationship between the age field value tests described above as the "switch" statement in line 14 of U4. Location 711 is "case 15" from line 15 of U4, and action 713 is Action4 from line 16 of U4. Likewise, location 712 is "case 20" from line 18 of U4 and action 714 is Action5 from line 19 of U4. FIG. 7, which is the unified evaluation-tree corresponding to the unified ruleset U4, illustrates how the unified evaluation-tree of a ruleset corresponds to a series of loops and tests in accordance with the principles of the present invention.

It should be noted that under the unification rules of the present invention, test sharing is recursive, meaning that it may occur at any nested level. For instance, two equivalent exemplary rules may be described by pseudo code of the following form:

```
R1:Foreach Person of the WM        R2:Foreach Person of the WM
{                                  {
    if (age == 10)                     if (age == 10)
        if (name is "Roger")               if (name is "Roger")
            <actions of R1>                    <actions of R2>
}                                  }
```

Because the two exemplary conditions operate upon the same class, the unification of these two conditions under the present invention contains a shared loop. The unification of the two exemplary rules under the present invention may be expressed in pseudo code of the following form:

```
R1 U R2:Foreach Person of the WM {
    if (age == 10)
        If (name is "Roger" ) {
            <actions of R1>
            <actions of R2>
        }
}
```

Because both tests of the two rules are equivalent, they are merged into a single set of tests, with the actions being executed after the second level of nested tests are satisfied. This optimization performed under the present invention could not be done in the sequential algorithm.

It should also be noted that under the unification rules of the present invention, loop sharing is recursive, meaning that it may occur at any nested level. For instance, two exemplary rules with equivalent conditions may be described by pseudo code of the following form:

```
R1:Foreach Person of the WM        R2:Foreach Person of the WM
{                                  {
    Foreach Account of the WM          Foreach Account of the WM
    {                                  {
        <actions of R1>                    <actions of R2>
}}                                 }}
```

Because the two exemplary conditions operate upon the same classes, the unification of these two conditions under the present invention contains shared loops. The unification of the two exemplary rules under the present invention may be expressed in pseudo code of the following form:

```
R1 U R2:Foreach Person of the WM {
    Foreach Account of the WM {
        <actions of R1>
        <actions of R2>
    }
}
```

Because both conditions of the two rules act upon the same classes, they are merged into a single set of shared loops, with the actions being executed sequentially at the second level of looping. This optimization performed under the present invention could not be done in the sequential algorithm.

The present invention also supports the unification of heterogeneous rules. For instance, two exemplary heterogeneous rules may be described by pseudo code of the following form:

```
R1:Foreach Person of the WM        R2:Foreach Person of the WM
{                                  {
    <actions of R1>                    Foreach Account of the WM
}                                      {
                                           <actions of R2>
                                   }}
```

The rules here are heterogeneous because they contain a different number of conditions. R1, operating only on the Person class, has a single condition, while R2, which operates upon both the Person and the Account classes, has two conditions. The unification of the two exemplary rules under the present invention may be expressed in pseudo code of the following form:

```
R1 U R2:Foreach Person of the WM {
    <actions of R1>
    Foreach Account of the WM {
        <actions of R2>
    }
}
```

Because the two exemplary conditions have the Person class in common, the unification of these two conditions under the present invention share the loop acting on the Person class. This optimization performed under the present invention could not be done in the sequential algorithm.

The present invention is able to operate on a set of objects, which as observed in the background section can not be done by the sequential algorithm. Furthermore, the present invention is able to use discrimination tests to implement join tests, an optimization used in the RETE algorithm, but generally not used in the sequential algorithm. For example, a rule may state that when a person has the age field value of 10 and an account balance greater than $10,000, then a promotional coupon is given to that person. This exemplary rule operates upon two classes, the "person" class and the "account" class, and may be expressed in pseudo code of the following form:

```
Rule R1 {
    when { p:Person(age==10);
        Account(balance>10000; owner is p ); }
    then { <give promotion coupon> }
}
```

For this exemplary rule, "age==10" and "balance >10000" are the discrimination tests, and "owner is p" is the join test because it acts upon both the "person" object the first condition matches and the "account" object the second condition matches. The implementation of this exemplary rule under the present invention may be expressed in pseudo code of the following form:

```
1   S_person = new Subset;
2   Foreach Person of the WM {
3       if (age == 10)
4           add the person to S_person
5   }
6   S_account = new Subset;
7   Foreach Account of the WM {
8       if (balance > 10000)
9           add the account to S_account
10  }
11  Foreach Person "p" in S_person {
12      Foreach Account in S_account {
13          if (owner is "p")
14              <give promotion coupon>
15  }}
```

As seen above, the exemplary rule here would be implemented as three loops. First, as seen in lines 1-5 above, a loop would be implemented on the Person class to generate the subset of objects satisfying the test "age==10." The next step, as seen in lines 6-10, a loop would be implemented on the Account class to generate the subset of objects satisfying the test "balance >10000." Finally, as seen in lines 11-15, a loop would be implemented upon the subset S_person, generated in lines 1-5, and a nested loop would be run upon the subset S_account, generated in lines 6-10. The join test would then be executed in line 13, acting upon the subsets satisfying the discrimination tests instead of the working memory as a whole, as would be done in the sequential algorithm. This optimization generally results in greater efficiency.

The present invention is able to implement and unify conditions that operate on sets of objects. For instance, two exemplary rules may be expressed in the following form:

```
Rule R1 {                          Rule R2 {
    when { exists                      when { not
    Person(age==10); }                 Person(age==10); }
        then { <actions of R1>             then { <actions of R2>
    }                                  }
}                                  }
```

Exemplary rule R1 contains an "exists" condition, stating that if there is an object with an age field value of 10 in the Person class, then perform actions associated with R1. Exemplary rule R2 contains a "not" condition, stating that if there is not an object with an age field value of 10 in the Person class, then perform actions associated with R2. Translating the two exemplary rules into loops yields the following pseudo code:

```
R1: found = false;                 R2: found = false;
Foreach Person of the WM {         Foreach Person of the WM {
    if (age == 10)                     if (age == 10)
        found = true;                      found = true;
    break;                             break;
}                                  }
If (found)                         If (not found)
    <actions of R1>                    <actions of R2>
```

For "exists" and "not" conditions, a flag "found" is used to track whether or not the tests are satisfied. For R1, for example, if the age field value is 10 for any object of the Person class, then found is set to true and the loop on the objects of the Person class is broken. A test is then executed checking the value of found, and if found has the value "true," the actions associated with R1 are executed. The present invention recognizes that the "exists" and "not" conditions are inherently complementary when the tests are equivalent, as they are for exemplary rules R1 and R2. The unification of these two rules under the present invention may be expressed in pseudo code of the following form:

```
R1 U R2:
found = false;
LOOP:Foreach Person of the WM
    if (age==10) {
        found = true;
        exit LOOP;
    }
If (found)
        <actions of R1>
Else
        <actions of R2>
```

Because the two exemplary conditions operate upon the same class, the unification of these two conditions under the present invention contains a shared loop. Because the tests from R1 and R2 are equivalent, only a single flag is used for the unification of these two exemplary rules. Also, because the "exists" and "not" conditions are complementary, the test executed after the loop on the objects of the Person class is shared in the unification. One skilled in the art would recognize that the unification here implemented in accordance with the principles of the present invention would generally result in greater efficiency than known rule execution algorithms.

The present invention is able to implement and unify "collect" conditions. For instance, two exemplary rules may be expressed the following form:

```
Rule R1 {                         Rule R2 {
    when { collect                    when { collect
Person(age==10)                   Person(age==20)
        where (size > 4);                 where (size > 3);
    }                                 }
    then { <actions of R1>            then { <actions of R2>
    }                                 }
}                                 }
```

The "collect" condition of exemplary rule R1 states that when the set of objects from the Person class where the age field value is 10 contains greater than 4 objects, then execute the actions associated with R1. Translating the two exemplary rules into loops yields the following pseudo code:

```
R1: subset1 = new Subset;         R2: subset2 = new Subset;
LOOP:Foreach Person of the        LOOP:Foreach Person of the
WM {                              WM {
    if (age == 10)                    if (age == 20)
        add the person to                 add the person to
subset1;                          subset2;
}                                 }
If (the size of subset1 >         If (the size of subset2 >
4)                                3)
        <actions of R1>                   <actions of R2>
```

For the two exemplary rules here, subset1 and subset2 are the subsets of objects from the Person class that satisfy the tests "age==10" and "age==20" respectively. For R1, as an example, after the loop is used to process every object from the Person class, a test is applied to subset1 to determine if there are greater than 4 objects in subset1. The unification of R1 and R2 under the present invention may be expressed in pseudo code of the following form:

```
R1 U R2:
Subset1 = new Subset;
Subset2 = new Subset;
LOOP:Foreach Person of the WM
    switch (age) {
        case 10:
            add the person to subset1;
            break;
        case 20:
            add the person to subset2;
            break;
    }
}
If (the size of subset1 > 4)
        <actions of R1>
If (the size of subset2 > 3)
        <actions of R2>
```

Because the two exemplary conditions operate upon the same class, the unification of these two conditions under the present invention contains a shared loop. Because the tests from R1 and R2 are disjoint, a "switch" construct is used for the unification of these two exemplary rules in accordance with the unification rules discussed above. The loop sharing implemented here in accordance with the principles of the present invention generally results in greater efficiency than known rule execution algorithms. It will be understood, by one of ordinary skill in the art, that it is more efficient to use a single loop to build the two collected sets rather than using two separate loops before performing further testing on the collected sets.

The present invention supports use of the "in" construct. For instance, two exemplary rules may be expressed in pseudo code of the following form:

```
Ruleset RS {                      Ruleset RS {
    Collection SetPersons;            Collection SetPersons;
}                                 }
Rule R1 {                         Rule R2 {
    when { Person(age==10)            when { Person(age==20)
in SetPersons; }                  in SetPersons; }
    then { <actions of R1>            then { <actions of R2>
    }                                 }
}                                 }
```

The first three lines of each of the above exemplary rules declares a ruleset parameter SetPersons that is a subset of objects from the Person class. The "in" construct causes R1 and R2 to act upon the subset SetPersons instead of the entire set of objects of the Person class in the working memory. Translating the two exemplary rules into loops yields the following exemplary pseudo code:

```
Ruleset RS {                      Ruleset RS {
    Collection SetPersons;            Collection SetPersons;
}                                 }
R1:Foreach Person in              R2:Foreach Person in
SetPersons {                      SetPersons {
    If (age == 10)                    if (age == 20)
            <actions of R1>                   <actions of R2>
}                                 }
```

The unification of R1 and R2 under the present invention may be expressed in pseudo code of the following form:

```
Ruleset RS {
    Collection SetPersons;
}
R1 U R2:Foreach Person in SetPersons {
    switch (age) {
        case 10: <actions of R1> break;
        case 20: <actions of R2> break;
    }
}
```

Because the two exemplary conditions operate upon the same subset of the same class, the unification of these two conditions under the present invention contains a shared loop. Because the tests from R1 and R2 are disjoint, a "switch" construct is used for the unification of these two exemplary rules in accordance with the unification rules discussed above. The loop sharing implemented here in accordance with the principles of the present invention generally results in greater efficiency than known rule execution algorithms.

The present invention supports use of the "from" construct. For instance, two exemplary rules may be expressed in pseudo code of the following form:

```
Ruleset RS {                    Ruleset RS {
    Person thatPerson;              Person thatPerson;
}                               }
Rule R1 {                       Rule R2 {
    when { Person(age==10)          when { Person(age==20)
from thatPerson; }              from thatPerson; }
    then { <actions of R1>          then { <actions of R2>
}                               }
}                               }
```

The first three lines of each of the above exemplary rules declare a ruleset parameter thatPerson, an object of the Person class passed as input parameter to the ruleset. The "from" construct causes R1 and R2 to act upon the object assigned to thatPerson instead of every object of the Person class. Translating the two exemplary rules into loops yields the following pseudo code:

```
R1:                             R2:
Let thatPerson be the           Let thatPerson be the
Person;                         Person
If (age == 10)                  if (age == 20)
    <actions of R1>                 <actions of R2>
```

The unification of R1 and R2 under the present invention may be expressed in pseudo code of the following form:

```
R1 U R2:
Let thatPerson be the Person;
switch (age) {
    case 10: <actions of R1> break;
    case 20: <actions of R2> break;
}
```

Because the tests from R1 and R2 are disjoint, a "switch" construct is used for the unification of these two exemplary rules in accordance with the unification rules discussed above. The loop sharing implemented here in accordance with the principles of the present invention generally results in greater efficiency than known rule execution algorithms.

While a preferred illustrative embodiment of the invention is described above, it will be apparent to one skilled in the art that various changes and modifications may be made therein without departing from the invention. The appended claims are intended to cover all such changes and modifications that fall within the true spirit and scope of the invention.

What is claimed is:

1. A method, within a computer hardware system, for processing a ruleset,
the ruleset including a plurality of rules,
each individual rule of the plurality of rules including a condition and a rule action responsive to the condition being met,
each condition within an individual rule including a plurality of tests,
the method comprising:
identifying a plurality of relationships, each identified relationship is between a plurality of tests respectively associated with different conditions;
translating, by the computer hardware system, each individual rule of the plurality of rules into a coded series of one or more loops and tests; and
unifying, by the computer hardware system, the loops and the test from each individual rule of the plurality of rules into a unified series of loops and tests for the ruleset, wherein
the unifying based upon the identified plurality of relationships.

2. The method of claim 1, wherein
one of the identified plurality of relationships is a disjoint.

3. The method of claim 2, wherein
the plurality of tests respectively associated with the disjoint relationship are unified into a switch test.

4. The method of claim 1, further comprising
translating the unified series of loops and tests into a pattern matching code for the ruleset; and
evaluating an object set using the pattern matching code for the ruleset.

5. The method of claim 4, further comprising
generating auxiliary code, distinct from the pattern matching code, including coded object manipulations and rule actions; and
performing the object manipulations and the rule actions on an object in the object set using the auxiliary code.

6. The method of claim 1, wherein
each identified relationship having a type selected from the group consisting of equality, complement, subsumption, disjoint, and unrelated.

7. A computer hardware system for processing a ruleset,
the ruleset including a plurality of rules,
each individual rule of the plurality of rules including a condition and a rule action responsive to the condition being met,
each condition within an individual rule including a plurality of tests,
the computer hardware system comprising:
a memory;
at least one processor connected to the memory, the at least one processor configured to perform
identifying a plurality of relationships, each identified relationship is between a plurality of tests respectively associated with different conditions;
translating each individual rule of the plurality of rules into a coded series of one or more loops and tests; and
unifying the loops and the test from each individual rule of the plurality of rules into a unified series of loops and tests for the ruleset, wherein
the unifying based upon the identified plurality of relationships.

8. The method of claim 7, wherein
one of the identified plurality of relationships is a disjoint.

9. The method of claim 8, wherein
the plurality of tests respectively associated with the disjoint relationship are unified into a switch test.

10. The computer hardware system of claim 7, wherein
the at least one processor is further configured to perform
translating the unified series of loops and tests into a pattern matching code for the ruleset; and
evaluating an object set using the pattern matching code for the ruleset.

11. The computer hardware system of claim 10, wherein
the at least one processor is further configured to perform
generating auxiliary code, distinct from the pattern matching code, including coded object manipulations and rule actions; and performing the object manipulations and the rule actions on an object in the object set using the auxiliary code.

12. The computer hardware system of claim 7, wherein
each identified relationship having a type selected from the group consisting of equality, complement, subsumption, disjoint, and unrelated.

13. A computer-readable storage medium having stored therein computer usable program code for processing a ruleset,
the ruleset including a plurality of rules,
each individual rule of the plurality of rules including a condition and a rule action responsive to the condition being met,
each condition within an individual rule including a plurality of tests,
the computer usable program code, upon being executed by a computer hardware system, causing the computer hardware system to perform
identifying a plurality of relationships, each identified relationship is between a plurality of tests respectively associated with different conditions;
translating each individual rule of the plurality of rules into a coded series of one or more loops and tests; and
unifying the loops and the test from each individual rule of the plurality of rules into a unified series of loops and tests for the ruleset, wherein
the unifying based upon the identified plurality of relationships.

14. The computer-readable storage medium of claim 13, wherein
one of the identified plurality of relationships is a disjoint.

15. The computer-readable storage medium of claim 14, wherein
the plurality of tests respectively associated with the disjoint relationship are unified into a switch test.

16. The computer-readable storage medium of claim 13, further comprising
translating the unified series of loops and tests into a pattern matching code for the ruleset; and
evaluating an object set using the pattern matching code for the ruleset.

17. The computer-readable storage medium of claim 16, further comprising
generating auxiliary code, distinct from the pattern matching code, including coded object manipulations and rule actions; and
performing the object manipulations and the rule actions on an object in the object set using the auxiliary code.

18. The computer-readable storage medium of claim 13, wherein
each identified relationship having a type selected from the group consisting of equality, complement, subsumption, disjoint, and unrelated.

* * * * *